March 17, 1925.

A. T. HARTWICK

SPOTLIGHT FOR VEHICLES

Filed Aug. 7, 1924

1,530,462

Inventor.
Arthur T. Hartwick
By Glenn S. Noble,
Atty.

Patented Mar. 17, 1925.

1,530,462

UNITED STATES PATENT OFFICE.

ARTHUR T. HARTWICK, OF CHICAGO, ILLINOIS.

SPOTLIGHT FOR VEHICLES.

Application filed August 7, 1924. Serial No. 730,703.

*To all whom it may concern:*

Be it known that I, ARTHUR T. HARTWICK, a citizen of the United States, residing at Chicago, in the county of Cook and State of Illinois, have invented certain new and useful Improvements in Spotlights for Vehicles, of which the following is a specification.

This invention relates to spot lights or search lights applicable for use in motor vehicles and particularly to such lights as may be mounted to project through the windshield or other fixed part of the vehicle.

The objects of this invention are to provide an improved spot light for vehicles, which may be cheaply constructed and which may be readily mounted in the windshield; to provide a spot light which may be mounted in the windshield glass and which is provided with adjustable tension means for holding it in position and to make a tight joint; to provide a ball and socket support having a novel form of socket; and, in general, to provide such improved construction as will appear more fully from the following description taken in connection with the accompanying drawings in which—

Figure 1:
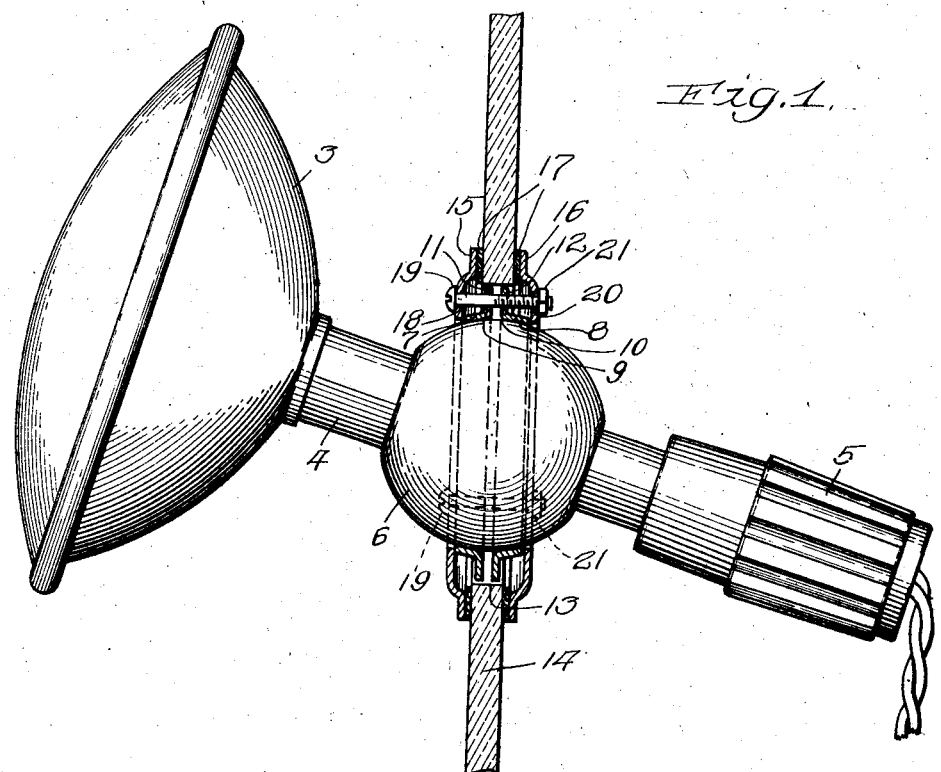
Figure 2:
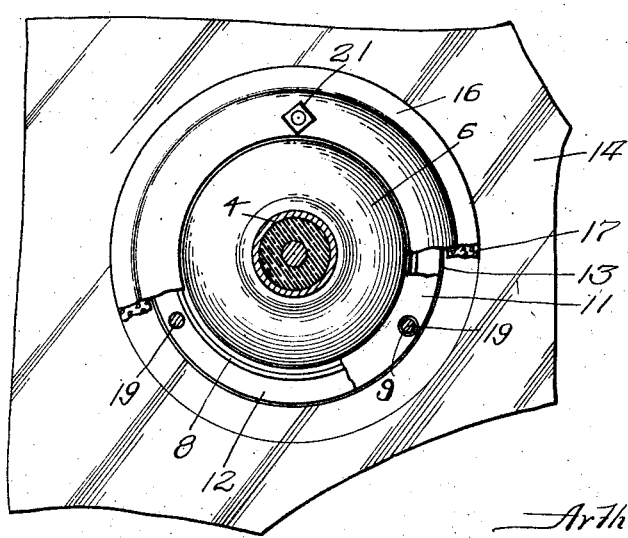

Figure 1 is a side view of the lamp with the bearing or supporting part shown in section; and Figure 2 is a front view with parts broken away or shown in section.

As shown in these drawings the spot light 3 is mounted at one end of a tubular support 4 the other end having a handle 5 which also serves to operate the switch for controlling the light. The light is provided with the usual socket for receiving the bulb and the necessary electrical connections but as such parts do not constitute the novel features of the present invention they are not illustrated in the drawings.

The tube 4 is secured or carried in a spherical support or ball 6 which may be made of any suitable material such as hard rubber, fibre, wood or the like. This ball is mounted in a bearing or socket to provide for universal movement of the light. The bearing or socket comprises two washers 7 and 8 having outwardly projecting flanges 11 and 12. The inner diameters of the rings or washers 7 and 8 are slightly less than the diameter of the ball 6 so that they may be adjusted to make a tight fit over the ball. The outer diameters of the flanges 11 and 12 are slightly less than the hole 13 which is made in the windshield glass 14 for receiving the spot light. Two retaining rings 15 and 16 are provided for engagement with the glass and to hold the washers 7 and 8 in position. Packing rings or washers 17 may be inserted between the rings and the glass.

One of the particularly unique features of this invention is the arrangement whereby the bearing or support may be adjusted to the ball and whereby the supporting rings are clamped to the windshield glass. The ring 15 is provided with holes 18 for receiving the screws 19. These screws pass through holes 9 in the flange 11 and engage with threaded holes 10 in the flange 12. The bolts also pass through holes 20 in the ring 16 and are provided with nuts 21 on their projecting ends. It will be noted that the inner periphery of the ring 15 abuts against the washer or bearing member 7 so that by turning the bolts 19 the washers or bearing members 7 and 8 may be adjusted toward and away from each other so as to regulate the pressure on the ball 6. When the bolts have been adjusted to give the desired pressure, the nuts 21 may then be tightened which will clamp the rings 15 and 16 against the sides of the windshield in order to hold the device securely in position. Sufficient clearance between the washer or bearing member 8 and the ring 16 may be provided by selecting the proper thickness of washer 17 so that pressure will be brought against said washer to clamp the parts together.

It will be seen that my improved lamp and particularly the supporting portion thereof may be cheaply constructed and may be readily applied to the windshield by cutting a single hole therein and securing the parts thereto in the manner described. It will also be apparent that the device may be modified to provide for different forms and sizes and for different uses or conditions and therefore I do not wish to be limited to the exact arrangement shown and described except as specified in the following claims, in which I claim:

1. The combination with a spot light having a substantially spherical bearing member of a pair of bearing washers for engagement with said bearing member, said washers having outwardly projecting flanges, a windshield having a hole for receiving said flanged members, rings for supporting said flanged members, bolts adapted to pass through one of said rings and engage with threaded holes in the oppositely disposed flange and to project through holes in the opposite ring and nuts engaging with said bolts to draw the rings against the windshield.

2. The combination with a spot light having a spherical bearing member, of oppositely disposed flanged washers, a windshield having an opening for receiving said washers, rings on either side of said washers for engagement with the windshield, one of said rings being adapted to abut against the adjacent washer, bolts passing through said ring and engaging with threaded holes in the oppositely disposed flanged washer, said bolt also passing through holes in the opposite ring and nuts for engagement with said bolt and last named ring for pressing the rings against the windshield.

3. The combination with a windshield having a hole therethrough, of a pair of rings adapted to engage with the shield around the hole, packing washers between the rings and the shield, bolts for drawing the rings together, a pair of bearing members arranged between the rings, one of said members being adapted to abut against the adjacent ring, the other members having threaded holes for receiving the threaded portions of the bolts and a spot light having a substantially spherical projection for engagement with said bearing members.

ARTHUR T. HARTWICK.